United States Patent
Vogt et al.

(10) Patent No.: US 11,288,465 B2
(45) Date of Patent: Mar. 29, 2022

(54) WIRELESS MONITORING AND PROFILING OF REACTOR CONDITIONS USING PLURALITY OF SENSOR-ENABLED RFID TAGS HAVING KNOWN LOCATIONS

(71) Applicant: SHELL OIL COMPANY, Houston, TX (US)

(72) Inventors: Kaspar Joseph Vogt, Houston, TX (US); David Winn Fuchs, Katy, TX (US)

(73) Assignee: SHELL OIL COMPANY, Houston, TX (US)

( * ) Notice: Subject to any disclaimer, the term of this patent is extended or adjusted under 35 U.S.C. 154(b) by 0 days.

(21) Appl. No.: 16/960,730

(22) PCT Filed: Jan. 9, 2019

(86) PCT No.: PCT/US2019/012882
§ 371 (c)(1),
(2) Date: Jul. 8, 2020

(87) PCT Pub. No.: WO2019/139974
PCT Pub. Date: Jul. 18, 2019

(65) Prior Publication Data
US 2020/0342186 A1    Oct. 29, 2020

Related U.S. Application Data

(60) Provisional application No. 62/616,148, filed on Jan. 11, 2018.

(51) Int. Cl.
*G06K 7/10* (2006.01)
*H04Q 9/00* (2006.01)
(Continued)

(52) U.S. Cl.
CPC ......... *G06K 7/10108* (2013.01); *G01D 21/00* (2013.01); *G06K 7/10316* (2013.01);
(Continued)

(58) Field of Classification Search
CPC ........... G06K 7/10108; G06K 7/10366; G06K 7/10316; G06K 7/0095; G06K 19/0723;
(Continued)

(56) References Cited

U.S. PATENT DOCUMENTS 7,397,370 B2    7/2008    Bratkovski
7,642,742 B2    1/2010    Curello et al.
(Continued)

FOREIGN PATENT DOCUMENTS

WO    2003098175 A1    11/2003
WO    2012104230 A1    8/2012
(Continued)

OTHER PUBLICATIONS

International Search Report and Written Opinion received for PCT Patent Application No. PCT/US2019/012882, dated Apr. 11, 2019, 9 pages.
(Continued)

*Primary Examiner* — Brian Wilson
(74) *Attorney, Agent, or Firm* — Shell Oil Company

(57) ABSTRACT

Disclosed is a system and method for wirelessly monitoring 5 process conditions within a reactor vessel. A plurality of sensor-enabled radio frequency identification (RFID) tags are disposed at known locations throughout a catalyst bed of a vessel and are used to measure various conditions within the vessel. The sensor-enabled RFID tags are encoded with individual identification codes and are wirelessly linked to a transceiver. A transceiver 10 provides for the interrogation of each sensor-enabled RFID tag to receive responsive transponder signals that carry information representative of
(Continued)

both the three-dimensional location of the sensor-enabled RFID tags and the sensed conditions within the reactor. This allows for three-dimensional profiling of the specifically measured condition within the reactor.

26 Claims, 3 Drawing Sheets

(51) Int. Cl.
*G01D 21/00* (2006.01)
*G06K 7/00* (2006.01)

(52) U.S. Cl.
CPC .......... *G06K 7/10366* (2013.01); *H04Q 9/00* (2013.01); *G06K 7/0095* (2013.01); *H04Q 2209/47* (2013.01)

(58) Field of Classification Search
CPC .......... G06K 19/0717; G06K 19/0775; G06K 19/0715; G06K 19/0725; H04Q 9/00; H04Q 2209/47; G01D 21/02; G01D 21/00; B01J 8/025; B01J 2208/00061; B01J 2208/00539; B01J 2208/00548; B01J 2208/00584; B01J 2208/00592; B01J 2208/00628; B01J 2208/00734; G08B 21/20; H01Q 9/42; H01Q 1/2225; G01N 2291/02845
See application file for complete search history.

(56) References Cited

U.S. PATENT DOCUMENTS

| | | | |
|---|---|---|---|
| 7,846,397 B2 * | 12/2010 | Gregg | G01K 1/024 422/105 |
| 8,106,778 B2 | 1/2012 | Killian et al. | |
| 8,257,875 B2 | 9/2012 | Rea et al. | |
| 8,658,024 B2 * | 2/2014 | Long | B01J 29/46 208/120.35 |
| 9,035,766 B2 | 5/2015 | Worthington et al. | |
| 9,317,795 B2 | 4/2016 | Forster | |
| 9,412,061 B2 | 8/2016 | Forster | |
| 9,563,833 B2 | 2/2017 | Swager et al. | |
| 9,678,030 B2 | 6/2017 | Potyrailo et al. | |
| 2004/0233043 A1 * | 11/2004 | Yazawa | G06K 19/0717 340/10.3 |
| 2007/0215709 A1 | 9/2007 | Baude et al. | |
| 2009/0092522 A1 | 4/2009 | Gregg et al. | |
| 2009/0231127 A1 * | 9/2009 | Angell | G06K 7/0008 340/539.22 |
| 2010/0070084 A1 | 3/2010 | Steinberg et al. | |
| 2013/0057390 A1 | 3/2013 | Watt et al. | |
| 2014/0294041 A1 | 10/2014 | Zhang et al. | |
| 2015/0268079 A1 | 9/2015 | Lund et al. | |
| 2015/0360343 A1 | 12/2015 | Yavelberg | |
| 2017/0286820 A1 | 10/2017 | Nikunen et al. | |

FOREIGN PATENT DOCUMENTS

| | | |
|---|---|---|
| WO | 2014062066 A1 | 4/2014 |
| WO | 2019139946 A1 | 7/2019 |
| WO | 2019139953 A1 | 7/2019 |
| WO | 2019139974 A1 | 7/2019 |

OTHER PUBLICATIONS

Office Action Received for CN Application No. 201980007605.4, dated Sep. 3, 2021, 24 Pages (15 Pages of English Translation and 9 Pages of Official Copy).

* cited by examiner

WIRELESS MONITORING AND PROFILING OF REACTOR CONDITIONS USING PLURALITY OF SENSOR-ENABLED RFID TAGS HAVING KNOWN LOCATIONS

CROSS REFERENCE TO RELATED APPLICATIONS

This is a national stage application of International application No. PCT/US2019/012882, filed 9 Jan. 2019, which claims priority of U.S. Provisional Application No. 62/616,148, filed 11 Jan. 2018.

CROSS REFERENCE TO RELATED APPLICATIONS

The present application claims the benefit of U.S. Provisional Patent Application Ser. No. 62/616,148, filed on 11 Jan. 2018, the entire disclosure of which is hereby incorporated by reference.

FIELD OF THE INVENTION

This invention relates to a system and method for wirelessly monitoring and three-dimensional profiling of conditions within a process vessel such as a reactor.

BACKGROUND

Reactor vessels containing catalyst are common to refineries and chemical plants. In operating these reactors it is desirable to measure or monitor the process conditions inside the vessel because this information can help in controlling the reaction conditions within the reactor vessel. Current methods for measuring the conditions inside a reactor vessel require having a physical connection, such as an electrical or pneumatic connection, to the sensor that transmits sensor-measured information for external display. One example of such measurement means is the use of thermocouples to measure temperature. In order to use a thermocouple to measure the temperature at a location within a reactor vessel, a thermowell is necessary. The thermowell is installed through the vessel wall, and it extends to a location at which temperature is measured within the vessel.

It is desirable to have the ability to measure and observe process conditions at locations within a reactor vessel and to wirelessly transmit the information for collection and processing at a remote location. It further is desirable to be able to provide a three-dimensional profile of conditions throughout the volume of a reaction zone defined by a vessel. We have proposed using sensor-enabled radio frequency identification (RFID) tags for measuring several of the conditions within a reactor volume, such as pressure, temperature, fluid composition, vapor and liquid composition, pH, and flow rate, and wirelessly transmitting the measured information for remote collection and processing.

An example of a sensor-enabled RFID tag used to measure environmental conditions is described in U.S. Pat. No. 7,397,370. This patent presents a system that provides for monitoring an environment using a plurality of radio frequency identification ("RFID") assemblies. The system may include an RFID tag, having an associated unique identification ("ID") code, configured with a sensor for sensing information regarding the environment, and an antenna for wirelessly transmitting the sensed information to a processing system. The transmitted information received by the processing system includes the sensed environmental information along with the associated identification code and is processed to provide for monitoring an environment and changes in the monitored environment.

Another reference that describes the use of sensor-enabled RFID tags for measuring and tracking variable environmental conditions is U.S. Pat. No. 8,106,778. This patent discloses a method and system capable of tracking variable conditions using radio frequency identification (RFID). An RFID sensor tag is used to measure a variable condition, such as location, temperature, pressure, and humidity. In response to an interrogation signal transmitted by an RFID reader device, the RFID sensor tag transmits a signal that includes associated tag identification data with the variable data representing the measured condition. The response signal includes both variable data and non-variable data so that the measured conditions can be associated with the tag identification data. The RFID reader device may also receive a plurality of response signals each from one of a plurality of RFID tags. In this case, at least one of the plurality of response signals can include variable data representing a measured condition at the respective one of the plurality of RFID tags and tag identification data of the respective one of the plurality of RFID tags.

Patent Publication US 2007/0215709 discloses an RFID-based sensor that includes RFID circuitry combined with a sensor. The sensor element is configured to change conductivity state based on its exposure to a physical condition of the ambient surroundings to which the sensor is exposed. These physical conditions may include the presence or absence of gas, light, sound, temperature, pressure, moisture, and/or other conditions of the environment. In response to an RF signal transmitted by an RFID interrogator, the RFID-based sensor transmits for receipt by the RFID interrogator an identification (ID) code and other information associated with present or prior exposure of the RFID-based sensor to one or more physical conditions. The RFID-based sensor may also be powered by the RF energy delivered by the RFID interrogator.

U.S. Pat. No. 9,317,795 discloses an RFID sensing system that includes an array of sensing elements disposed on a surface. Each sensing element includes an RFID microchip, an antenna operatively coupled to the microchip, and a pressure-sensitive material disposed on the antenna. An RFID reader system provides an interrogation signal to each sensing element that transmits a signal back to the RFID reader via the coupled antenna when the pressure-sensitive material of a sensing element of the mat is compressed.

These publications do not disclose or suggest anything about using sensor-enabled RFID tags to measure process or environmental conditions within a reactor vessel or to wirelessly transfer information related to measured conditions within a reactor vessel for further receipt, processing and use. In fact, persons skilled in the art would not expect RF signals to be capable of transmission through a vessel that contains a volume of catalyst particles or hydrocarbons without significant distortion or attenuation, or both, of the RF signal. This is because it previously has been thought that the catalyst particles, which contain significant concentrations of catalytic metals, will cause distortion or severe attenuation of the RF waves transmitted by RFID tags and RF interrogators as they pass through the catalyst particles.

The publications further fail to disclose or teach anything about providing for wireless monitoring and three-dimensional profiling of the physical conditions within a reaction zone defined by a reactor vessel.

We, however, have invented a system and method that provide for local sensing or measurement of environmental or process conditions at specific locations within a reactor and for the wireless transmission through the reactor to a receiver of RF waves that contain information representative of the measured condition within the reactor. This allows for three-dimensional profiling of conditions within a volume.

SUMMARY

Accordingly, provided is a system for wirelessly monitoring and profiling process conditions within a reactor vessel. The reactor vessel of the system defines a reaction zone, which includes a catalyst bed that comprises catalyst particles and a plurality of sensor-enabled RFID tags disposed at known locations within the catalyst bed. An RFID reader antenna is wirelessly linked or coupled to each sensor-enabled RFID tag and is capable of transmitting an interrogation signal and receiving an RFID transponder signal that is transmitted responsive to the interrogation signal. Each of the sensor-enabled RFID tags of the plurality is encoded with a unique non-variable identification code and is capable of sensing a reactor condition within the reaction zone, receiving the interrogation signal, and, responsive to the interrogation signal, transmitting the RFID transponder signal that includes information representative of the unique non-variable identification code and of a reactor condition that is associated with the sensor-enabled RFID tag. The system provides for determining and profiling process conditions at specific locations throughout the reaction zone.

Also provided is a method of wirelessly monitoring and profiling process conditions within a reactor vessel that defines a reaction zone and which includes a catalyst bed that comprises catalyst particles and a plurality of sensor-enabled RFID tags disposed at known locations within the catalyst bed. The method includes transmitting by way of an RFID reader antenna an interrogation signal that is received by each of the sensor-enabled RFID tags. In response to the interrogation signal, each of the sensor-enabled RFID tags transmits its associated RFID transponder signal that includes information representing a unique non-variable identification code and a surrounding condition that is associated with the sensor-enabled RFID tag. The RFID reader antenna receives each of the associated RFID transponder signals and processes the associated RFID transponder signals. This method provides for determining and profiling process conditions at specific locations throughout the reaction zone.

DETAILED DESCRIPTION

Figure 1:
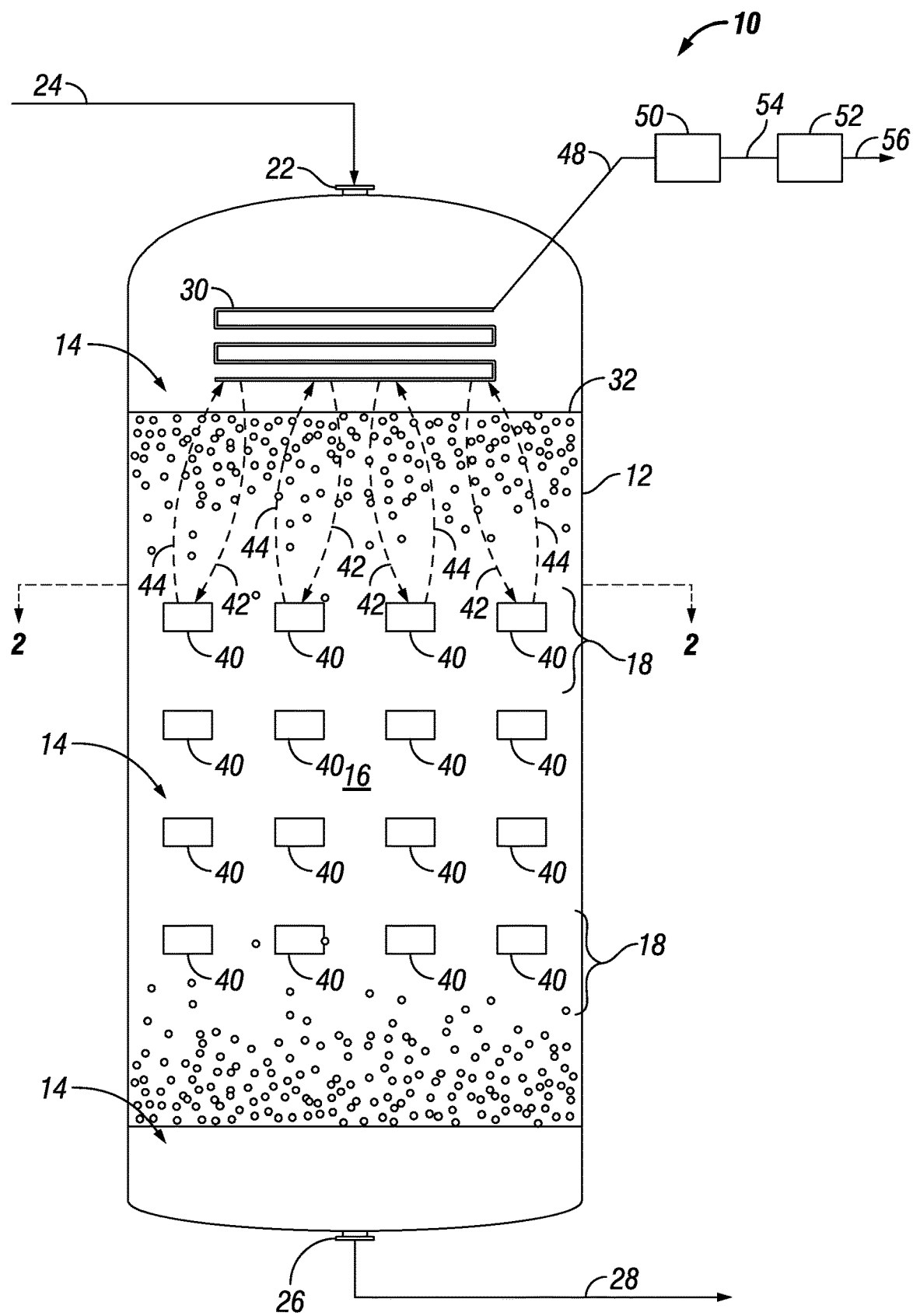
FIG. 1 is a schematic that represents an embodiment of the inventive system for wirelessly monitoring and three-dimensional profiling of conditions within the reaction zone of a reactor vessel.

Embodiments of the invention include both a system and method for wirelessly monitoring conditions within a reactor vessel and for providing three-dimensional profiles of the conditions throughout the reactor zone defined by the reactor vessel.

Filed concurrently with this patent application are the three related provisional patent applications entitled "SP2119-Wireless Monitoring and Profiling Of Reactor Conditions Using Arrays Of Sensor-Enabled RFID Tags Placed At Known Reactor Heights," "SP2066-Wireless Reactor Monitoring System Using Passive Sensor Enabled RFID Tag," and "SP2102-Wireless Monitoring and Profiling Of Reactor Conditions Using Plurality Of Sensor-Enabled RFID Tags And Multiple Transceivers," and respectively having Ser. Nos. 62/616,185; 62/616,166; and 62/616,155.

Measured conditions within the reactor vessel can include process or environmental conditions, such as, the pressures or temperatures at various locations within a reactor vessel. The measured conditions may further include other parameters such as vapor and liquid percentages, flow rates, pH, and chemical compositions of fluids contained within or passing through the reactor vessel.

The invention provides for remotely measuring conditions within a reactor using sensor-enabled RFID tags placed at specific or known locations throughout the reaction zone of a reactor vessel and wirelessly transmitting the measured information by radio wave transmission to a transceiver and processing system. The processing system includes means, such as a computer with associated program code, for processing the information contained in the signals transmitted by sensor-enabled RFID tags to provide a three-dimensional profile of the conditions within the reactor vessel. To do this, the invention requires the use of a plurality of sensor-enabled RFID tags each providing means for measuring or sensing one or more environmental conditions existing at locations within and throughout the reaction zone of a reactor vessel.

In this specification, each sensor-enabled RFID tag is a device that includes a sensor configured with or operatively connected to a passive RFID tag. The sensor provides means for sensing an environmental or process condition or parameter within the reactor vessel and means for providing a signal input, which contains information representative of the particularly measured condition or parameter, to the connected RFID tag. Passive RFID tags taught in the art include an integrated circuit coupled with a transponder antenna for receiving an interrogation signal from an RFID reader antenna (transceiver) and for transmitting responsive to receiving the interrogation signal a transponder signal.

Since the sensor-enabled RFID tag is passive, it transmits an RFID transponder signal in response to receiving an interrogation signal transmitted by the RFID reader antenna of the system. As noted above, the sensor is integrated with an RFID tag and is capable of sensing one or more conditions within the reaction zone. The sensor component of the RFID sensor may be selected from a group of any suitable sensors known to those skilled in the art. Examples of the environmental conditions or parameters sensed or measured by the sensor include pressure, temperature, chemical composition, vapor and liquid composition, density, flow rate, pH, vibration, radiation, magnetic flux, light intensity, and sound intensity. Preferred sensor elements include those selected from the group consisting of temperature sensors, pressure sensors, chemical sensors, humidity sensors, pH sensors, flow sensors, liquid/vapor sensors and any combination thereof.

The integrated sensor and RFID tag provides means for sensing a reactor condition, receiving an interrogation signal, and, responsive to the interrogation signal, transmitting an RFID transponder signal containing information that is representative of the measured reactor condition. The patent publications US 2013/0057390; U.S. Pat. Nos. 9,563,833; 9,412,061; 9,035,766; and WO 03/098175 present examples of sensor-enabled RFID tags. We incorporate these patent publications herein by reference.

A necessary feature of the invention is for each of the sensor-enabled RFID tags to be encoded with a unique, non-variable identification code. This is important, because in response to receiving a transceiver signal each sensor-enabled RFID tag transmits the unique tag identification data along with the variable data measured or sensed by the associated sensor. The transmission of information representative of both the unique non-variable tag identification code and variable information representative of a reactor environmental condition measured or sensed by the RFID sensor provides for associating the transmitted variable information with a particular sensor. Since the sensor-enabled RFID tags are disposed at known locations throughout and within the reaction zone or catalyst bed or beds of the reactor, having both the non-variable tag id information and associated variable environmental conditions information allows for processing of the information to provide three-dimensional profiling of the reactor zone.

Therefore, the sensor-enabled RFID tag is encoded with a unique, non-variable identification code and is capable of sensing a reactor condition near its surroundings within the reaction zone. The sensor-enabled RFID tag further is capable of receiving an interrogation signal from a transceiver, and, responsive to the interrogation signal, transmitting an RFID transponder signal that includes information representative of both the unique non-variable identification code and the measured reactor condition associated with the sensor-enabled RFID tag.

The reactor vessel of the invention may be any suitable vessel made with any suitable material known to those skilled in the art. In many applications, the reactor vessel generally defines a volume that contains catalyst and into which is introduced reactants or feedstocks. In one embodiment of the invention, the reactor vessel defines a reaction zone within which is a catalyst bed comprising catalyst particles. The reaction zone may also include multiple beds of catalyst, including what are known as stacked beds. The reaction zone may be filled by any suitable arrangement of catalyst or catalyst beds, including being completely filled with catalyst particles or support particles, or both.

The reactor vessel may further be equipped with an inlet that provides fluid communication into the reaction zone and means for introducing a feed stream, such as hydrocarbons, into the reaction zone. The reactor vessel may also be equipped with an outlet that provides fluid communication from the reaction zone and means for removing an effluent stream, such as reaction products, from the reaction zone.

Any type of feed stream or fluid may be introduced into or contained within the reaction zone of the reactor vessel, including water, hydrocarbons, and other chemicals. Examples of hydrocarbons include naphtha, kerosene, diesel, gas oil, and heavy oil such as resid. Typically, the reaction zone contains one or more beds of catalyst particles along with any of the aforementioned fluids that preferably include any of the listed hydrocarbons.

The catalyst particles in the reaction zone may be of any size and shape typically used in industry, including extrudates of any shape (e.g., cylinders, dilobes, trilobes, and quadralobes), spheres, balls, irregular aggregates, pills and powders. The catalyst particle sizes can be in the range of from 0.1 mm to 200 mm, but, more typically, the size of the catalyst particles is in the range of from 0.5 mm to 100 mm, or from 1 mm to 20 mm, and they may have any composition.

Common catalyst compositions include an inorganic oxide component, such as, silica, alumina, silica-alumina, and titania. The catalyst composition further can comprise a catalytic metal component, such as any of the transition metals, including chromium, molybdenum, tungsten, rhenium, iron, cobalt, nickel, palladium, platinum, gold, silver, and copper. The concentration of the metal components of the catalyst particles may be upwardly to 60 wt. %, based on metal, regardless of its actual state, and, typically, the metal concentration is in the range of from 0.1 to 30 wt. %, based on metal, regardless of its actual state.

Another feature of the invention is that only a single RFID reader antenna or transceiver is required to provide for three-dimensional profiling of the conditions within the reaction zone of the reactor. While more than one transceiver may be used as elements of the inventive system or inventive process, disposing a plurality of the sensor-enabled RFID tags at known locations within and throughout the reaction zone or in the catalyst bed or beds of the reactor vessel allows using a single RFID reader antenna to provide for profiling of the reactor volume or reaction zone.

In an embodiment of the invention, a plurality of sensor-enabled RFID tags are placed within the catalyst bed of the reaction zone so that each of the sensor-enabled RFID tags is surrounded by catalyst particles. For a typical reactor, the geometric dimensions of depth and width define the catalyst bed. For reactors that are definable by depth and width, a typical depth of the catalyst bed is in the range of from 0.5 to 20 meters, and a typical effective width of the catalyst bed is in the range of from 0.5 to 20 meters. Thus, the sensor-enabled RFID tag can be surrounded by a layer or envelop of catalyst particles having a thickness upwardly to 20 meters requiring the interrogation and transponder signals to pass through a bed thickness of catalyst particles of from about 0.5 to about 20 meters.

An RFID reader antenna is placed at any location that is remote to the sensor-enabled RFID tags within the catalyst bed of the reaction zone; provided, that, the RFID reader antenna is wirelessly linked to or coupled with each of the sensor-enabled RFID tags of the plurality. The RFID reader antenna is configured to allow for transmission of an interrogator signal to each of the sensor-enabled RFID tags of the plurality and for receiving responsive transponder signals from each of the sensor-enabled RFID tags of the plurality.

It is preferred to position the RFID reader antenna within the reaction zone since this eliminates the need for the interrogator signal and the transponder signals to pass through the wall of the reactor vessel. However, another embodiment of the inventive system is to position or place the RFID antenna external to the reactor vessel.

The RFID reader antenna is operatively connected to a reader that provides an interrogation signal to the RFID reader antenna and provides for receiving the RFID transponder signals transmitted by each of the sensor-enabled RFID tags of the plurality. Computer means provides for processing the information carried by each of the RFID transponder signals and for displaying or otherwise providing an output relating three-dimensional profile information about conditions throughout the reaction zone.

We now refer to FIG. 1, which is a schematic representation of an embodiment of inventive system 10 for wirelessly monitoring and profiling process conditions within reactor vessel 12. Reactor vessel 12 defines a reaction zone 14. Reaction zone 14 contains catalyst bed 16 that is filled with and comprises catalyst particles 18. Reactor vessel 12 is equipped with inlet nozzle 22 that is operatively connected to conduit 24. Inlet nozzle 22 provides means for fluid communication through conduit 24 and means for introducing a feed into reaction zone 14. Reactor vessel 12 is also equipped with outlet nozzle 26 operatively connected to conduit 28 and providing means for fluid communication through conduit 28 and means for removing an effluent from reaction zone 14.

FIG. 1 shows one embodiment of the inventive system 10 that includes RFID reader antenna 30 positioned within reaction zone 14. While the figure shows RFID reader antenna 30 as located above surface 32 of catalyst bed 16, it is understood that RFID reader antenna 30 may be placed anywhere within reaction zone 14, including within the boundary of and surrounded by catalyst particles of catalyst bed 16. Alternatively, while not shown, RFID reader antenna 30 may be placed at a location external to reactor vessel 12.

It is important, however, to position RFID reader antenna 30 so that it is wirelessly linked to or coupled with each of sensor-enabled RFID tags 40 which together they provide a plurality of sensor-enabled RFID tags 40 distributed throughout reaction zone 14 and within catalyst bed 16.

Figure 2:
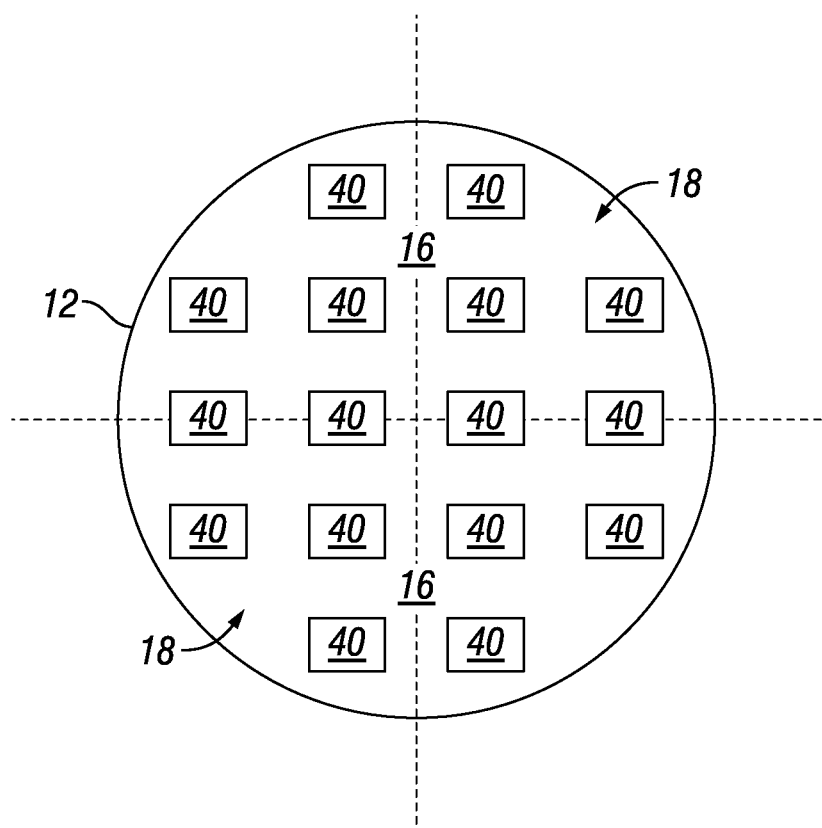
FIG. 2 is a plan view of cross-section A-A of the reactor vessel depicted in FIG. 1.

A plan view of cross section A-A is depicted in FIG. 2. The positions of each sensor-enabled RFID tag 40 are shown in FIG. 1 and FIG. 2, which illustrate how the plurality of sensor-enabled RFID tags 40 may be placed or disposed at known locations within catalyst bed 16. The FIG.s depict sensor-enabled RFID tags 40 placed in ordered planar arrays and at ordered locations of various elevations within catalyst bed 16 of reaction zone 14. The sensor-enabled RFID tags 40, however, need not be placed in such an ordered pattern; provided, that the locations of each sensor-enabled RFID tag 40 is identified or identifiable and the locations can be associated with a specific sensor-enable RFID tag 40 of the plurality. Thus, knowing the location of each sensor-enabled RFID tag 40 allows for communicating non-variable tag id information and the one or more measured environmental conditions information associated with its respective sensor-enabled RFID tag 40 by the transmission of an RFID transponder signal for receipt by RFID reader antenna 30.

In the operation of inventive system 10, RFID reader antenna 30 transmits interrogation signal 42 to each sensor-enabled RFID tag 40 of the plurality. This is depicted in FIG. 1 by separate, individual arrows extending from RFID reader antenna 30 only to each sensor-enabled RFID tag 40 of the first planar array of sensor-enabled RFID tags 40. However, it is recognized that interrogation signal 42 is actually a single radio wave that is simultaneously transmitted to all the sensor-enabled RFID tags 40 of the plurality spread throughout catalyst bed 16. Each sensor-enabled RFID tag 40 of the plurality receives interrogation signal 42. In response to receiving interrogation signal 42, each sensor-enabled RFID tag 40 respectively transmits its RFID transponder signal that includes information representative of the unique non-variable identification code encoded in the sensor-enable RFID tag 40 and information representative of a variable reactor condition sensed or measured by and associated with the sensor-enabled RFID tag 40.

RFID reader antenna 30 is operatively connected by cable to reader 50. Reader 50 provides means for providing the interrogation signal 42 to RFID reader antenna 30 and means for receiving RFID transponder signals 44 from RFID reader antenna 30. Computer 52 and reader 50 are configured together by cable 54, which provides means for communicating between reader 50 and computer 52. Computer 52 provides means for processing RFID transponder signals 44 received by RFID reader antenna 30 and for providing output information 56 relating to the measured environmental conditions throughout reaction zone 14 and three-dimensional profiles of the measured environmental conditions throughout reaction zone 14 for display or storage in memory.

FIG. 2 presents a plan view of the cross-section A-A of reactor vessel 12 shown in FIG. 1.

FIG. 2 illustrates how each of the plurality of sensor-enabled RFID tags 40 might be placed at known locations within the reactor zone 14 of reactor vessel 12.

Figure 3:
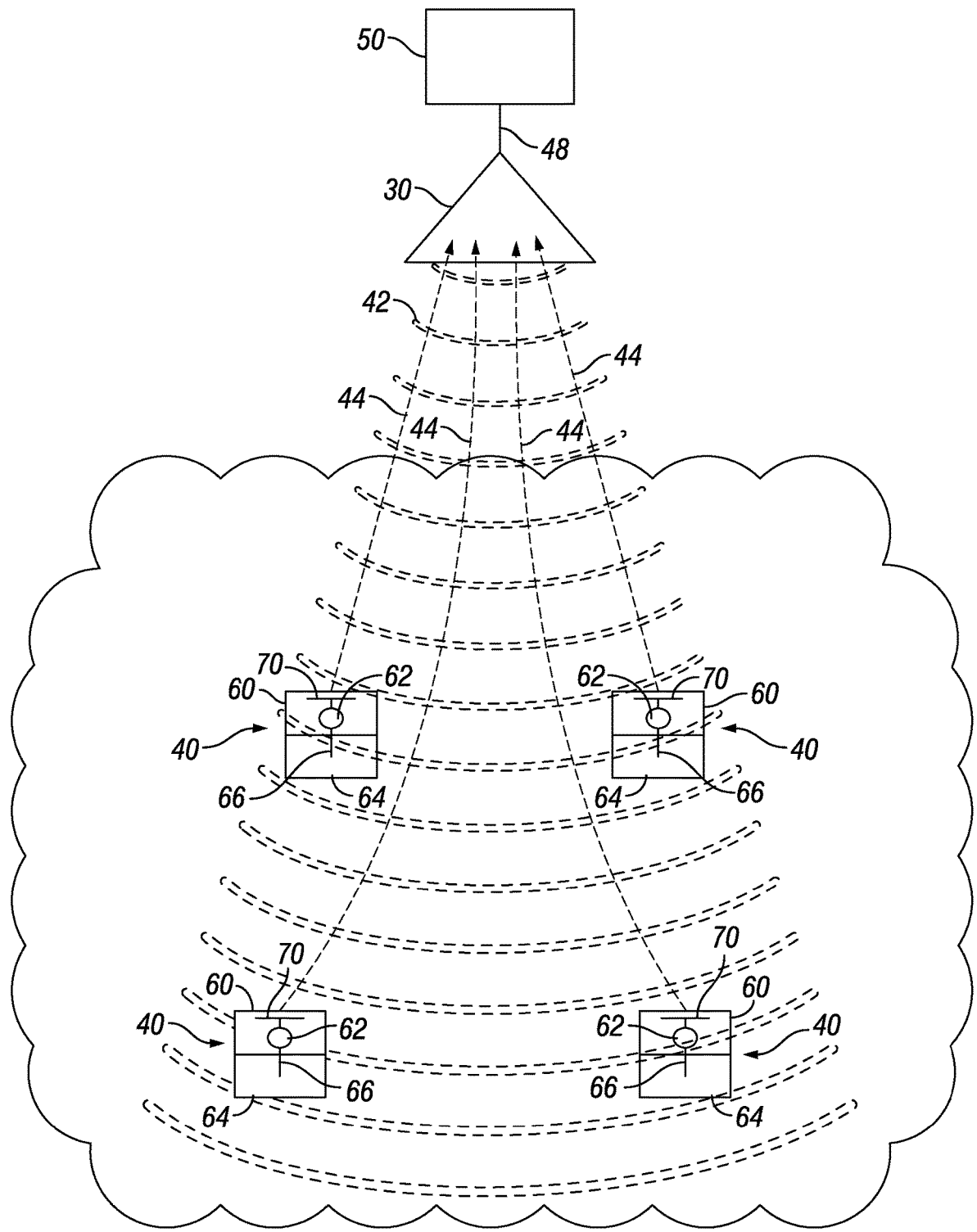
FIG. 3 is a diagram illustrating certain elements of the wireless reactor monitoring and three-dimensional profiling system that includes a plurality of sensor-enabled RFID tags disposed at known locations within a catalyst bed and an RFID reader/interrogator that is wirelessly linked to each sensor-enabled RFID tag of the plurality and connected to a computer for processing the information contained in RF signals transmitted by each of the sensor-enabled RFID tags of the plurality.

FIG. 3 presents an enlarged detail that includes several sensor-enabled RFID tags 40 among the plurality of sensor-enabled RFID tags 40 surrounded by environment 58 of catalyst particles 18. FIG. 3 further shows a relationship with certain other elements of inventive system 10 such as RFID reader antenna 30 and reader 50.

Each of the sensor-enabled RFID tags 40 comprises a passive RFID tag 60 that includes an integrated circuit 62. Integrated circuit 62 provides for the storage a non-variable identification code associated with and representing the specific sensor-enabled RFID tag 40. Sensor-enabled RFID tag 40 provides for the receipt of variable input information from sensor 64 that is representative of at least one condition of environment 58.

Sensor 64 is configured with passive RFID tag 60 and is operatively connected to passive RFID tag 60 by connection 66. Sensor 64 is capable of sensing or detecting a condition of environment 58 by use of element 68 or any other suitable sensing means capable of providing an analog or digital input to integrated circuit 62 that is representative of the environmental condition measured. Integrated circuit 62 provides for the modulation of RFID transponder signal 44 responsive to a sensor input signal provided via connection 66 so that RFID transponder signal 44 includes or carries information that is representative of the measured condition within environment 58. Contained within environment 58 are catalyst particles 18.

Integrated circuit 62 is operatively connected to an RFID tag antenna 70 providing means for transmitting an RFID transponder signal 44 that carries, in addition to individual tag identification code information, variable input information from sensor 64 that is representative of at least one condition within environment 58 that surrounds or envelops the sensor-enabled RFID tag 40. Sensor-enabled RFID tag 40 transmits RFID transponder signal 44 in response to receiving interrogation signal 42 transmitted by RFID reader antenna 30.

That which is claimed is:

1. A system for wirelessly monitoring and profiling process conditions within a reactor vessel, wherein the system comprises:

the reactor vessel that defines a reaction zone, wherein within the reaction zone is a catalyst bed comprising catalyst particles having a metal component;

a plurality of sensor-enabled RFID tags that are disposed at known locations within the catalyst bed and surrounded by the catalyst particles wherein each sensor-enabled RFID tag of the plurality is encoded with an unique non-variable identification code, and wherein each sensor-enabled RFID tag of the plurality is configured to sense a reactor condition within the reaction zone, to receive an interrogation signal, and, in response to the interrogation signal, to transmit an RFID transponder signal that includes information representative of the unique non-variable identification code and of the reactor condition that is associated with the sensor-enabled RFID tag; and an RFID reader antenna that is wirelessly linked to each sensor-enabled RFID tag of the plurality and that is configured to transmit the interrogation signal and to receive the RFID transponder signals that are transmitted by each sensor-enabled RFID tag of the plurality in response to the interrogation signal; whereby the process conditions at specific locations throughout the reaction zone are determined and profiled.

2. The system as recited in claim 1, wherein the catalyst particles further comprise an inorganic oxide component.

3. The system as recited in claim 1, wherein each sensor-enabled RFID tag of the plurality comprises an RFID tag operatively connected to sensor means for sensing an environmental or process condition and for providing a signal input to the RFID tag representative of the environmental or process condition.

4. The system as recited in claim 3, wherein the RFID reader antenna is positioned within the reaction zone of the reactor vessel.

5. The system as recited in claim 4, wherein the reactor condition is selected from the group of environmental conditions consisting of pressure, temperature, chemical composition, vapor and liquid composition, density, flow rate, pH, vibration, radiation, magnetic flux, light intensity and sound intensity.

6. The system as recited in claim 5, wherein the RFID reader antenna is operatively connected to a reader for providing the interrogation signal to the RFID reader antenna and for receiving each of the RFID transponder signals transmitted by each sensor-enabled RFID tag of the plurality received by the RFID reader antenna.

7. The system as recited in claim 6, further including computing means configured with the RFID reader antenna and providing for processing of the RFID transponder signals transmitted by each of the sensor-enabled RFID tags of the plurality to provide output representing three-dimensional profiling of the process conditions within the reaction zone of the reactor vessel.

8. The system as recited in claim 3, wherein the RFID reader antenna is positioned external to the reaction zone of the reactor vessel.

9. The system as recited in claim 8, where the reactor vessel includes inlet means providing fluid communication for introducing a feed stream into the reaction zone and outlet means providing fluid communication for removing an effluent stream from the reaction zone.

10. The system as recited in claim 9, wherein the reactor condition is selected from the group of environmental conditions consisting of pressure, temperature, chemical composition, vapor and liquid composition, density, flow rate, pH, vibration, radiation, magnetic flux, light intensity and sound intensity.

11. The system as recited in claim 10, wherein the RFID reader antenna is operatively connected to a reader for providing the interrogation signal to the RFID reader antenna and for receiving each of the RFID transponder signals transmitted by each sensor-enabled RFID tag of the plurality received by the RFID reader antenna.

12. The system as recited in claim 11, further including computing means configured with the RFID reader antenna and providing for processing of the RFID transponder signals transmitted by each of the sensor-enabled RFID tags of the plurality to provide output representing three-dimensional profiling of the process conditions within the reaction zone of the reactor vessel.

13. The system as recited in claim 1, wherein at thickness of the catalyst particles surrounding the sensor-enabled RFID tags of the plurality is from about 0.5 to about 20 meters.

14. A method of wirelessly monitoring and profiling process conditions within a reactor vessel, wherein the method comprises:

providing the reactor vessel that defines a reaction zone, wherein within the reaction zone is a catalyst bed comprising catalyst particles having a metal component and a plurality of sensor-enabled RFID tags that are disposed at known locations within the catalyst bed and surrounded by the catalyst particles;

wherein each of the sensor-enabled RFID tags of the plurality is encoded with a unique non-variable identification code and is further configured to measure a surrounding condition within the catalyst bed that is associated with the sensor-enabled RFID tag of the plurality and to transmit, in response to an interrogation signal, a responsive signal that includes information representative of the unique non-variable identification code and the surrounding condition associated therewith;

transmitting by an RFID reader antenna the interrogation signal, wherein in response to the interrogation signal, each of the sensor-enabled RFID tags of the plurality transmits its associated responsive signal;

receiving by the RFID reader antenna each of the associated responsive signals of the plurality; and processing the associated responsive signals to determine and profile the process conditions throughout the reaction zone.

15. The method as recited in claim 14, wherein the catalyst particles further comprise an inorganic oxide component.

16. The method as recited in claim 15, wherein each sensor-enabled tag of the plurality comprises an RFID tag operatively connected to sensor means for sensing an environmental or process condition and for providing a signal input to the RFID tag representative of the environmental or process condition.

17. The method as recited in claim 16, wherein the RFID reader antenna is positioned within the reaction zone of the reactor vessel.

18. The method as recited in claim 17, wherein the surrounding condition is selected from the group of environmental conditions consisting of pressure, temperature, chemical composition, vapor and liquid composition, density, flow rate, pH, vibration, radiation, magnetic flux, light intensity and sound intensity.

19. The method as recited in claim 18, wherein the RFID reader antenna is operatively connected to a reader for providing the interrogation signal to the RFID reader antenna and for receiving each of the responsive signals transmitted by each sensor-enabled RFID tag of the plurality received by the RFID reader antenna.

20. The method as recited in claim 19, further including computing means configured with the RFID reader antenna and providing for processing of the responsive signals transmitted by each of the sensor-enabled RFID tags of the plurality to provide output representing three-dimensional profiling of the process conditions within the reaction zone of the reactor vessel.

21. The method as recited in claim 16, wherein the RFID reader antenna is positioned external to the reaction zone of the reactor vessel.

22. The method as recited in claim 21, where the reactor vessel includes inlet means providing fluid communication for introducing a feed stream into the reaction zone and outlet means providing fluid communication for removing an effluent stream from the reaction zone.

23. The method as recited in claim 22, wherein the surrounding condition is selected from the group of environmental conditions consisting of pressure, temperature, chemical composition, vapor and liquid composition, density, flow rate, pH, vibration, radiation, magnetic flux, light intensity and sound intensity.

24. The method as recited in claim 23, wherein the RFID reader antenna is operatively connected to a reader for providing the interrogation signal to the RFID reader antenna and for receiving each of the responsive signals transmitted by each sensor-enabled RFID tag of the plurality received by the RFID reader antenna.

25. The method as recited in claim 24, further including computing means configured with the RFID reader antenna and providing for processing of the responder signals transmitted by each of the sensor-enabled RFID tags of the plurality to provide an output representing three-dimensional profiling of the process conditions within the reaction zone of the reactor vessel.

26. The method as recited in claim 14, wherein the interrogation and responsive signals pass through a bed thickness of catalyst particles of from about 0.5 to about 20 meters.

* * * * *